United States Patent [19]

Carius et al.

[11] Patent Number: 5,306,318
[45] Date of Patent: Apr. 26, 1994

[54] PROCESS FOR MAKING COATED ABRASIVES FOR GRINDING WHEELS

[75] Inventors: Alan C. Carius, Columbus; Edward J. Connors, Westerville; Daniel R. Riehle, Columbus, all of Ohio

[73] Assignee: General Electric Company, Worthington, Ohio

[21] Appl. No.: 32,750

[22] Filed: Mar. 17, 1993

Related U.S. Application Data

[63] Continuation of Ser. No. 758,023, Sep. 12, 1991, abandoned.

[51] Int. Cl.$^5$ .............................................. B24D 3/00
[52] U.S. Cl. .................................... 51/293; 51/295; 51/298; 51/309
[58] Field of Search .................. 51/293, 295, 298, 309

[56] References Cited

U.S. PATENT DOCUMENTS

| | | | |
|---|---|---|---|
| Re. 31,883 | 5/1985 | Bovenkerk et al. | 51/295 |
| 2,746,888 | 5/1956 | Ross | 117/221 |
| 3,556,839 | 1/1971 | Roy | 117/100 |
| 3,923,476 | 12/1975 | Roy et al. | 51/295 |
| 3,929,432 | 12/1975 | Caveney | 51/295 |
| 4,063,909 | 12/1977 | Mitchell | 51/309 |
| 4,399,167 | 8/1983 | Pipkin | 51/295 |
| 4,671,021 | 6/1987 | Takahashi et al. | 51/293 |
| 4,951,427 | 8/1990 | St. Pierre | 51/293 |
| 5,024,680 | 6/1991 | Chen et al. | 51/293 |
| 5,062,865 | 11/1991 | Chen et al. | 51/295 |

FOREIGN PATENT DOCUMENTS

| | | |
|---|---|---|
| 0139258 | 5/1985 | European Pat. Off. . |
| 0480878 | 4/1992 | European Pat. Off. . |
| 0485660 | 5/1992 | European Pat. Off. . |
| 61-168569 | 7/1986 | Japan . |
| 7807071 | 1/1980 | South Africa . |
| WO9005170 | 5/1990 | World Int. Prop. O. . |

*Primary Examiner*—Mark L. Bell
*Assistant Examiner*—Willie J. Thompson

[57] ABSTRACT

Processes for making coated cubic boron nitride abrasive particles for use in grinding wheels are provided having thick multilayer metal coatings which improve retention of the particles within abrasive tools. The metal coatings comprise a primary metal layer chemically bonded to the surface of the abrasive particles and a secondary layer which forms the bulk of the coating. Coated CBN abrasive particles, abrasive tools made therefrom and processes for their production are also provided.

10 Claims, No Drawings

PROCESS FOR MAKING COATED ABRASIVES FOR GRINDING WHEELS

This is a continuation of copending application Ser. No. 07/758,023 filed on Sep. 12, 1991, now abandoned.

BACKGROUND OF THE INVENTION

This invention relates to grinding wheels and similar tools of abrasives and processes for making the same. The tools produced comprise cubic boron nitride (CBN) abrasive particles bonded by a resin matrix material wherein the CBN abrasive particles have a thick multilayer metal coating to aid retention within the resin matrix.

It is well known in the art that a coating of nickel or titanium on cubic boron nitride abrasive particles improves their retention in the resin matrices of abrasive tools such as grinding wheels. Loss of the coated particles typically results from (a) separation of the particle from the coating and (b) separation of the coated particles from the matrix. Loss of abrasive particles which have become worn and rounded is necessary so that the abrasive tool remains sharp with the exposure of new abrasives, otherwise the tool will become ineffective.

Titanium coatings are typically applied to CBN abrasive particles by conventional salt bath techniques, such as is described in U.S. Pat. No. 2,746,888. An alternative procedure is described in U.S. Pat. No. 4,399,167, wherein a mixture of CBN abrasive particles and titanium powder are heat treated. Both procedures provide a thin titanium coating which is believed to be chemically bonded to the CBN abrasive.

Nickel coatings are typically applied to the CBN abrasive particles in thick layers of up to 60 weight percent of the particle by electrolytic deposition, electroless deposition and/or vapor deposition techniques. While these coated CBN abrasive particles have provided good performance in tools such as grinding wheels, the loss of the CBN abrasive particles is considered premature. Improvements in particle retention are desired without detracting from the cutting performance of the abrasive tool.

SUMMARY OF THE INVENTION

Accordingly, it is an object of the present invention to provide metal coated cubic boron nitride abrasive particles with improved retention within abrasive tools such as grinding wheels.

Another object of this invention to provide a process for making metal coated cubic boron nitride abrasive particles having a thick, strongly adherent, multilayer metal coating that aids particle retention within abrasive tools such as grinding wheels.

It is further object of the present invention to provide abrasive tools, such as grinding wheels, comprised of metal coated CBN abrasive particles, having improved particle retention, lubrication and thermal diffusion characteristics.

A further object of the present invention to provide a method for making abrasive tools, such as grinding wheels, comprised of CBN abrasive particles having a thick, strongly adherent, multilayer metal coating that aids particle retention.

Other objects will be apparent from the detailed description and claims which follow.

These and other objects are achieved by a process wherein cubic boron nitride abrasive particles are coated with a thick metal coating of at least two metal layers. The primary metal layer is preferably chemically bonded to the surfaces of the CBN abrasive particles. It is believed this chemical bond enhances the retention of the particles within the coating and the abrasive tool. The secondary metal layer applied to cubic boron nitride adds surface texture to the abrasive particles to aid their retention within the resin matrix of an abrasive tool. The amount of multilayer coating applied is in the range of 60-95 wt %, based on the weight of the CBN abrasive particles.

Included within the processes for coating CBN particles provided by this invention are those wherein the thermal diffusion properties and lubrication characteristics of the abrasive tools produced from the coated particles are controlled by means of selecting the particle size of the CBN abrasives, the metal layers to be applied and their thicknesses.

The processes for producing abrasive tools provided by this invention comprise applying thick, multilayer metal coatings to CBN abrasive particles as described above and binding the coated particles within a resin matrix.

Also provided are the multilayer metal coated CBN abrasive particles and abrasive tools produced by the above processes.

DETAILED DESCRIPTION OF THE PREFERRED EMBODIMENTS

The abrasive particles of cubic boron nitride utilized in the processes and articles of this invention are of a size conventionally used in grinding wheels such as, for example, those of 170/200 U.S. mesh size. The size of such particles can vary widely within the range of 1 to 1000 microns. The abrasives selected should be of sufficient size so that they will provide a cutting profile and not be excessively diluted by the metal coatings to be applied, which can otherwise hinder the performance of the tools made therefrom.

The cubic boron nitride abrasive particles used in this invention are typically obtained by conversion of hexagonal boron nitride under high pressure and temperature, either with or without a catalyst, such as described in U.S. Pat. Nos. 4,289,503, 2,947,617, 4,188,194 and 3,212,852. Suitable forms of hexagonal boron nitride include pyrolytic boron nitride and graphitic boron nitride. Included within the term "cubic boron nitride", are nitrides having the Wurtzitic structure (WCN), which is a compact hexagonal structure.

It is preferable to utilize CBN particles of a size directly obtained from a conversion process. However, the particles utilized in the present invention can be obtained from larger sized materials which are milled or pulverized by conventional techniques to the size desired. The CBN abrasive particles used can also be in the form of aggregates obtained by sintering metal coated CBN fines into a large mass and pulverizing this mass to obtain aggregates of a desired size. The metal coating on these CBN fines can be chemically bonded to the surface.

A primary metal layer is first applied to the cubic boron nitride abrasive particles, preferably by a technique which allows chemical bonding of the metal to the particle surface. Chemical bonding provides an interstitial layer of metallic carbide, boride, or nitride. Therefore, the preferred metals used are those which can form a carbide or nitride under conventional deposition conditions. These include titanium, zirconium, hafnium, vanadium, niobium, tantalum, chromium, molybdenum, tungsten, and the like, and alloys thereof. Titanium is preferred in many applications. The term "metal", as used herein, also includes the borides, nitrides, carbides and oxides of the above metals such as, for example, titanium carbide and titanium nitride.

The thickness and/or the amount of the primary metal layer of the coating applied to the CBN abrasive particles can vary widely. Submicron thicknesses, i.e., less than 0.1 μm can be used as well as thicknesses well above 5 μm such as, for example, 500 μm. However, it is preferable to have the one or more secondary metal layers provide the bulk of the metal coating. Preferably, the thickness of the primary metal layer is that obtained by a conventional salt bath deposition technique as described in U.S. Pat. No. 2,746,888. Such salt bath deposition techniques are preferred methods for depositing the primary metal layer on the CBN abrasive particles. The CBN abrasive particles are typically immersed within a molten bath of one or more alkali or alkaline earth halides and a metal in a valence state higher than zero to obtain deposition of the metal. A compound containing a metal in a higher valence state can be used such as a metal chloride, or a direct current can be passed between electrodes to electrolyze the salt bath and to provide ionized metals. When depositing titanium coatings, the titanium is in divalent form either as a titanium dihalide or by passing a direct current through titanium electrodes. The temperature of the titanium salt bath is typically between 800° to 1500° F. Further details of a suitable process can be found in U.S. Pat. No. 2,746,888.

Other methods for applying the primary metal layer are also suitable, including chemical vapor deposition (CVD) and more preferably by low pressure chemical vapor deposition (LPCVD) techniques. These techniques typically utilize sub-atmospheric conditions and high temperatures. Chemical vapor deposition methods are well known in the art, particularly for metal carbides, borides, nitrides and oxides, including titanium nitride and titanium carbide. Suitable chemical vapor deposition techniques, systems and devices are described in *Kirk-Othmer Encyclopedia of Chemical Technology*, Vol. 15, pp. 262-264 (1981).

Titanium carbide LPCVD coatings are derived from titanium tetrachloride, methane gas and hydrogen gas. Titanium nitride CVD coatings are derived from nitrogen gas and titanium tetrachloride. Titanium nitride coatings can also be formed wherein the nitrogen is derived from the surface of the CBN abrasive particles.

When coating the CBN abrasive particles by CVD or LPCVD techniques, it is preferable to remove oxides and volatile impurities from the surface, particularly surface oxide contaminants such as boron oxide, by vacuum firing. A suitable technique for removing these impurities is described in greater detail within U.S. Pat. No. 4,289,503. Prior to vacuum firing, it may also be desirable to remove residual metals or organics from the surfaces of the CBN abrasive particles by a conventional acid wash.

Other methods suitable for depositing the primary metal layer involves heat treating the CBN abrasive particles in the presence of powdered metal, as described in U.S. Pat. 4,399,167, or following electroless or electrolytic deposition of metals or alloys on the particles. Sufficient bonding strength must be obtained with the metal selected upon formation of an interstitial metal carbide or metal nitride layer.

The one or more secondary layers can be deposited by a number of techniques which include electroless, electrolytic, and vapor deposition techniques. Electrolytic and electroless deposition techniques and systems are described in Kirk-Othmer, Encyclopedia of Chemical Technology, Vol 15, pp. 241-274 (1981). Preferably, these techniques are performed under conditions which allow thick metal layers to form. Where desired, the secondary layer may be applied by LPCVD or salt bath deposition techniques.

Suitable metals used for the secondary layer include nickel and those described above for the primary layer. These include titanium, zirconium, hafnium, vanadium, niobium, tantalum, chromium, cobalt, molybdenum, tungsten, alloys thereof and the borides, nitrides, carbides and oxides thereof. Of the above metals, nickel is preferred and is typically deposited by electroless coating techniques with a nickel/hypophosphite solution which deposits a small percentage of phosphorus. A suitable electroless deposition process is described in U.S. Pat. No. 3,556,839.

The metal coating applied to CBN abrasive particles typically comprises only one primary metal layer and one secondary layer of a different metal. This bilayer metal coating is applied in an amount equivalent to 60-95 wt % of the CBN abrasive particles prior to coating. Preferred levels fall within the range of 65-80 wt % and approximate 70 wt % of the CBN abrasive particles before coating. The coating thickness is preferably in excess of 5 microns for CBN abrasive particles of size greater than about 35 microns. Thick coatings are desired to provide a rough textured surface for improved adhesion to the resin matrix. Amounts of metal coating larger than 95 wt % can provide improved retention within an abrasive tool but may dilute the abrasive excessively and reduce cutting performance. Amounts of metal coating smaller than 60 wt % can be useful for large particles where the coating thickness is greater than 5 microns, but CBN abrasive particles so coated may not show all the advantages of the present invention.

A typical embodiment is one wherein the primary layer is applied by salt bath deposition and the secondary layer is applied by an electroless deposition technique. A specific example of such a bilayer coating is one wherein the primary metal layer is titanium, deposited by a salt bath technique, and the secondary metal layer is nickel/phosphorus, deposited by an electroless deposition technique.

In controlling the resulting particle retention, lubrication and heat diffusion characteristics of an abrasive tool, the thickness of the metal coating may be varied, the type of metal coatings can be varied and the size of the CBN abrasive particles can be varied. One of ordinary skill in the art can determine the preferred metal coatings, granule sizes and coating thicknesses for the tool intended by routine investigation.

After the CBN abrasive particles are coated with metal, they may be used to form an abrasive tool such as a grinding wheel, by impregnating the coated particles within a suitable resin matrix. Impregnating the coated CBN abrasive particles within a resin matrix can be performed by conventional techniques, such as are described by Takahashi in U.S. Pat. No. 4,671,021. The coated particles are typically combined with a phenolic resin solution to form a mixture, which is shaped as desired within a mold. The phenolic resin is subsequently cured at elevated temperatures to bind the coated particles in a solid matrix to form a solid aggregate of high tensile strength. A preferred tool is a grinding wheel having CBN abrasive particles of a conventional size, preferably of 170/200 mesh size, which are coated with titanium and nickel/phosphorous as described above and bound by a phenolic resin.

The abrasive tools provided by this invention can be of any form or shape which is conventional for tools which incorporate CBN abrasive particles. Conventional dies and molds can be utilized to form these tools. The preferred tools are grinding wheels used to grind metals. Such abrasive tools show improved wear, lubricating and heat diffusion characteristics in use as compared to grinding wheels made without CBN abrasive particles having a thick, multilayer metal coating.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Cubic boron nitride abrasive particles of the commercial designation "CBN 500" (170/200 mesh) are coated with titanium in a salt bath of titanium metal and a mixture of salts including NaCl, KCl and CaCl in the proportion 40/55/5. The temperature of the bath is between 800°–1500° F. After about 2 hours of treatment, the particles are removed and weighed to determine the amount of titanium deposited. The particles have a titanium coating of a thickness of about 0.5 to 10 micron.

Titanium coated CBN abrasive particles based on the original weight of the particles, is overcoated with a series of nickel/phosphorus layers by an electroless deposition process. The solution used is a hypophosphite type nickel plating solution. The pH is usually between 4 and 5.5 and the temperature is maintained between 60°–95° C. Each layer in individually deposited from a separate bath and when the nickel is exhausted, the bath is discarded and a fresh bath is used for the next layer. From 5 to 20 layers may be used depending on size of batch container, but the weight percent of nickel/phosphorus is usually 60 to 75% with a phosphorus content between 6 and 11%.

The titanium-nickel/phosphorous coated CBN abrasive particles are then mixed with a conventional phenolic resin (phenol/formaldehyde resin) in a conventional weight ratio used for binding abrasives in a grinding wheel. The mixture is then molded into a grinding wheel of 7 mm width and 150 mm diameter by conventional techniques as described by Takahashi et al. U.S. Pat. No. 4,671,021.

EXAMPLE 2

Identical titanium coated cubic boron nitride abrasive particles of the commercial designation "CBN 500" (170/200 mesh) used in Example 1 are overcoated with nickel/phosphorus to provide a secondary metal layer by the electroless deposition techniques used in Example 1. The particles have a metal coating which is 75 wt % of the original weight of the CBN abrasive particles before coating.

The titanium-nickel/phosphorous coated CBN abrasive particles are mixed with an identical phenolic resin as used in Example 1 and molded into a grinding wheel (7 mm W × 150 mm D) by the same techniques used in Example 1.

COMPARATIVE EXAMPLES A–C

Cubic boron nitride abrasive particles under the trade designations "CBN 500" and "CBN Type I" (170/200 mesh size) are coated with nickel by an electroless deposition process utilizing the same equipment and procedure used in Example 1. Successful coating is evidenced by an increase in weight of the CBN particles.

The "CBN 500" particles are coated with nickel in an amount of 70 wt %, based on the original weight of CBN particles before coating. Separate samples of the "CBN Type I" particles are coated with 60 wt % nickel (Comparative Example B) and 70 wt % nickel (Comparative Example C), respectively, based on the original weight of the CBN particles before coating. These nickel/phosphorous coated CBN abrasive particles do not have a primary metal layer chemically bonded thereto.

Each of these coated CBN abrasive particles are mixed with an identical phenolic resin used in Example 1 and molded into a grinding wheel (7 mm W × 150 mm D) by the same techniques used in Example 1.

TEST OF RELATIVE GRINDING PERFORMANCE

The grinding performance of the wheels produced in Examples 1 and 2 is compared to that of the wheels produced in Comparative Examples A–C. All wheels are tested for grinding performance with a sample SKH 51 (HRc63) tool steel work piece on a reciprocating grinding table. The wheel speed is 30 m/sec, the table is reciprocated at a speed of 15 m/min and the down-feed rate is 0.025 mm. The grinding ratio (wheel loss/workpiece loss) is determined for each wheel after a predetermined period of grinding, typically more than 5 minutes. Wheels with a higher grinding ratio provide superior (lower) wear rates. Sample grinding ratios for the wheels of Examples 1 & 2 and Comparative Examples A–C, are shown below in Table I.

TABLE I

| | Grinding Ratio | | | | |
| --- | --- | --- | --- | --- | --- |
| | 200 | 300 | 400 | 500 | 600 |
| EXAMPLE 1 | | | | | 589 |
| EXAMPLE 2 | | | 481 | | |
| COMPARATIVE EXAMPLE A | 259 | | | | |
| COMPARATIVE EXAMPLE B | | 337 | | | |
| COMPARATIVE EXAMPLE C | | | 439 | | |

The results represented in Table I are approximate but indicate that the wear rates for the grinding wheels of the present invention are about 40 to 90% lower than those wheels containing CBN abrasive particles coated only with nickel/phosphorous by conventional techniques without utilizing a titanium primary metal layer.

The preceding examples can be repeated with similar success by substituting the generically or specifically described granules, metals and/or operating conditions of this invention for those used in the preceding examples.

From the foregoing description, one skilled in the art can easily ascertain the essential characteristics of this invention, and without departing from the scope thereof, can make various changes and modifications of the invention to adapt it to various usages and conditions.

What is claimed is:

1. A process for the preparation of coated-cubic boron nitride (CBN) abrasive for use in abrasive tools, said process comprising applying a metal coating to CBN abrasive particles of at least one primary metal layer and at least one secondary metal layer, wherein the amount of metal coating is 60-95 wt % of the original CBN abrasive particles before coating, said primary metal layer comprises titanium applied by salt bath deposition and said secondary metal layer comprises nickel/phosphorous applied by electrolyses deposition, said electrolyses deposition being carried out by depositing from about 5 to about 20 layers of electrolessly deposited nickel wherein the final wt % of nickel/phosphorous is from 60-75% of the total particle weight with a phosphorous content between 6 and 11%.

2. A process as in claim 1, wherein the amount of metal coating applied is about 65-80 wt % of the original CBN abrasive particles.

3. A process as in claim 1, comprising the additional steps of mixing the coated CBN abrasive particles with a phenolic resin, forming the mixture into a shape and curing the phenolic resin therein to obtain an abrasive tool.

4. Coated cubic boron nitride abrasive particles produced in accordance with the process of claim 1.

5. Coated abrasive particles suitable for use in grinding wheels which comprise cubic boron nitride (CBN) abrasives coated with at least one primary metal layer chemically bonded to the surface thereof and overcoated with at least one secondary metal layer, wherein the total weight of the metal coatings is 65-80 wt % of the CBN abrasive particles prior to coating.

6. Coated abrasive particles as in claim 5 wherein the CBN abrasives have an average particle size in the range of 1 to 1000 microns, the primary metal layer is titanium applied by salt bath deposition and the secondary layer is a nickel/phosphorous layer applied by electroless deposition.

7. An abrasive tool which comprises the coated cubic boron nitride abrasive particles of claim 4.

8. An abrasive tool which comprises cubic boron nitride (CBN) abrasive particles bonded by a resin matrix wherein the CBN abrasive particles are coated with at least one primary metal layer chemically bonded to the surface thereof, and overcoated with at least one secondary metal layer, wherein the total weight of the coating is 65-80 wt % of the original CBN abrasive particles prior to coating.

9. An abrasive tool as in claim 8, wherein the primary metal layer is titanium applied by salt bath deposition and the secondary metal layer is nickel/phosphorous, applied by electroless deposition.

10. An abrasive tool as in claim 8 which is a grinding wheel.

* * * * *